(12) United States Patent
Katakam et al.

(10) Patent No.: US 11,816,450 B2
(45) Date of Patent: Nov. 14, 2023

(54) SYSTEM AND METHOD FOR REAL-TIME AUTOMATED PROJECT SPECIFICATIONS ANALYSIS

(71) Applicant: JPMorgan Chase Bank, N.A., New York, NY (US)

(72) Inventors: Srinivas Venkatasubbaiah Katakam, Bangalore (IN); Sri Harsha Amalapurapu, Tuni (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/651,356

(22) Filed: Feb. 16, 2022

(65) Prior Publication Data
US 2023/0195423 A1  Jun. 22, 2023

(30) Foreign Application Priority Data
Dec. 22, 2021  (IN) .............................. 202111059966

(51) Int. Cl.
*G06F 8/10* (2018.01)
*G06V 30/19* (2022.01)
(Continued)

(52) U.S. Cl.
CPC .................. *G06F 8/10* (2013.01); *G06F 8/20* (2013.01); *G06F 9/547* (2013.01); *G06V 30/19093* (2022.01); *G06V 30/274* (2022.01)

(58) Field of Classification Search
CPC ... G06F 8/10–20; G06F 9/547; G06V 30/274; G06V 30/19093
(Continued)

(56) References Cited

U.S. PATENT DOCUMENTS 5,671,415 A * 9/1997 Hossain .............. G06F 8/20
717/121
6,144,954 A * 11/2000 Li ...................... G05B 19/0426
706/62

(Continued)

OTHER PUBLICATIONS

Konrad et al, "Real-time Specification Patterns", ACM, pp. 372-381 (Year: 2005).*

(Continued)

*Primary Examiner* — Anil Khatri
(74) *Attorney, Agent, or Firm* — GREENBLUM & BERNSTEIN, P.L.C.

(57) ABSTRACT

Various methods, apparatuses/systems, and media for real-time automated analysis of project specifications are disclosed. A processor calls an API to invoke an OCR microservice with the project specifications data as input data received from a plurality of applications each including a file corresponding to real-time project specifications data; determines whether the file corresponding to the project specification data is an image file; implements, based on determining, a neural network based image processing algorithm to extract data corresponding to the project specifications data from the input data; compares the extracted data corresponding to the project specifications data with predefined expected business results data; generates a similarity score, based on comparing, that identifies how similar the project specifications data is compared to the predefined expected business results data; and automatically generates a real-time analysis report on the project specifications in connection with the plurality of applications based on the similarity score.

14 Claims, 9 Drawing Sheets

(51) Int. Cl.
*G06F 8/20* (2018.01)
*G06F 9/54* (2006.01)
*G06V 30/262* (2022.01)

(58) Field of Classification Search
USPC .............................. 717/101–121; 706/12–45
See application file for complete search history.

(56) References Cited

U.S. PATENT DOCUMENTS

| | | | | |
|---|---|---|---|---|
| 6,289,342 | B1* | 9/2001 | Lawrence | G06F 16/951 707/999.102 |
| 6,453,315 | B1* | 9/2002 | Weissman | G06F 16/3338 707/999.005 |
| 7,822,597 | B2* | 10/2010 | Brun | G06F 40/295 715/255 |
| 8,054,592 | B2* | 11/2011 | Rivers, Jr. | H02H 1/0015 361/42 |
| 8,204,842 | B1* | 6/2012 | Zhang | G06N 5/02 706/45 |
| 8,515,890 | B2* | 8/2013 | Zadeh | G06N 20/00 706/45 |
| 9,459,780 | B1* | 10/2016 | Smith | G06F 11/34 |
| 9,665,350 | B1* | 5/2017 | Kalmar | G06F 8/34 |
| 10,255,065 | B1* | 4/2019 | Jensen | G06F 8/75 |
| 10,346,926 | B2* | 7/2019 | Eder | G06Q 10/06311 |
| 10,361,802 | B1* | 7/2019 | Hoffberg-Borghesani | G06F 3/00 |
| 10,387,575 | B1* | 8/2019 | Shen | G06F 40/35 |
| 11,176,443 | B1* | 11/2021 | Selva | G06F 18/25 |
| 11,494,851 | B1* | 11/2022 | Novak | G06Q 50/01 |
| 2021/0374040 | A1* | 12/2021 | Kumar | G06F 11/3664 |

OTHER PUBLICATIONS

Wilson et al, "Automated Analysis of Requirement Specifications", ACM, pp. 161-171 (Year: 1997).*
Lampka et al, "Analytic Real-Time Analysis and Timed Automata: A Hybrid Method for Analyzing Embedded Real-Time Systems", ACM 107-116 (Year: 2009).*
Saravia et al, "Similarity Analysis of Neuronal Activation Patterns", ACM, pp. 299-304 (Year: 2016).*
Laerhoven et al, "Real-time Analysis of Data from Many Sensors with Neural Networks", IEEE, pp. 115-122 (Year: 2001).*
Sharma et al, "Normalized Similarity based Semantic Approach for Discovery of Web Services", IEEE, pp. 467-470 (Year: 2014).*

* cited by examiner

SYSTEM AND METHOD FOR REAL-TIME AUTOMATED PROJECT SPECIFICATIONS ANALYSIS

CROSS-REFERENCE TO RELATED APPLICATIONS

This application claims the benefit of priority from Indian Provisional Patent Application No. 202111059966, filed Dec. 22, 2021 which is herein incorporated by reference in its entirety.

TECHNICAL FIELD

This disclosure generally relates to data processing, and, more particularly, to methods and apparatuses for implementing a project specification analysis module that may be configured for automatically providing real-time analysis of project specifications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

As software application becomes increasingly more complex, maintaining quality of software project specifications, testing, upgrading, etc. may also become more complex. Due to the rapid development of Internet applications, the SDK of a client application based on operating systems, e.g., IOS and Android, may need frequent upgrades to meet the needs of users and to provide a better user experience. For example, programming language may often upgrade in a way that is not backwards compatible with software that runs on the previous version.

Today, a wide variety of business functions are commonly supported by software applications and tools, i.e., business intelligence (BI) tools. For instance, software has been directed to data monitoring, performance analysis, project tracking, and competitive analysis, to name but a few. In general, large enterprises, corporations, agencies, institutions, and other organizations are facing a continuing problem of handling, processing, and/or accurately describing a vast amount of data that are crucial to plan actions at store level or market/regional level in an efficient and expedited manner.

Quality of software project specifications such as wireframes (i.e., layouts of web pages that demonstrate what interface elements will exist on key pages), UML (unified modeling language) diagrams, acceptance criteria, definition of ready, definition of done, test cases etc. may play a very crucial role in accelerating feature delivery, competitive business value, enhanced customer experience, near zero—defect products, faster TTM (time to market), operational excellence etc.

However, today's conventional project management tools may allow creating MVP (minimum viable product) artifacts (e.g., feature, epic, story, task, etc.) without providing all required details thereby resulting in speculations, missed features or requirements, delayed TTM etc. Also, the existing solutions provided by conventional project management tools have limited customization capabilities. Due to this shortcoming, most of the existing reviews may not be used as is and may need custom solutions to be developed which may increase the time to build and TTM. In addition, today's project management tools may not be configured for integrating well with existing systems of an organization, or latest authentication mechanisms, or support test automation and CICD (continuous integration continuous development) pipeline, thereby failing to support faster releases and failing to provide essentials for a secure, reliable system.

Thus, there is a need for an advanced project specification analysis tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic project specification analysis module that is configured for automatically providing real-time analysis of project specifications, but the disclosure is not limited thereto.

For example, the present disclosure, through one or more of its various aspects, embodiments, and/or specific features or sub-components, may also provide, among other features, various systems, servers, devices, methods, media, programs, and platforms for implementing a platform and language agnostic project specification analysis module that may be configured for automatically providing real-time analysis of project specifications thereby improving the quality of project specifications (e.g., acceptance criteria, test cases etc.) through automated and real-time comparison with business requirements (e.g., wireframes, service diagrams etc.), but the disclosure is not limited thereto.

For example, the present disclosure, through one or more of its various aspects, embodiments, and/or specific features or sub-components, may also provide, among other features, various systems, servers, devices, methods, media, programs, and platforms for implementing a platform and language agnostic project specification analysis module that may be configured for building an omni-channel, platform independent and in-house optical character recognition (OCR) service which can process text, image, or PDF files for data extraction or processing. For example, exemplary use cases may include: validating agreements, fraud dispute pre-arbitration forms, sanctions and check fraud detection, digital authentication etc., but the disclosure is not limited thereto.

According to an aspect of the present disclosure, a method for real-time automated analysis of project specifications by utilizing one or more processors along with allocated memory is disclosed. The method may include: providing a plurality of applications each including a file corresponding to real-time project specifications data; calling an application programming interface (API) to invoke an OCR microservice with the project specifications data as input data deployed on a cloud environment; determining whether the file corresponding to the project specification data is an image file; implementing, based on determining, a neural network based image processing algorithm to extract data corresponding to the project specifications data from the input data; comparing the extracted data corresponding to the project specifications data with predefined expected business results data; generating a similarity score, based on comparing, that identifies how similar the project specifications data is compared to the predefined expected business results data; and automatically generating a real-time analysis report on the project specifications in connection with the plurality of applications based on the similarity score.

According to yet another aspect of the instant disclosure, in generating the similarity score, the method may further include: implementing a cosine similarity algorithm to measure similarities between the real-time project specifications data and the predefined expected business results data.

According to a further aspect of the instant disclosure, in implementing the cosine similarity algorithm, the method may further include: converting the real-time project specifications data into a first semantic context data; converting the first semantic context data into a first semantic context vector; converting the predefined expected business results data into a second semantic context data; and converting the second semantic context data into a second semantic context vector.

According to an additional aspect of the instant disclosure, in implementing the cosine similarity algorithm, the method may further include: comparing the first semantic context vector and the second semantic context vector; automatically generating, in response to comparing, the similarity score that indicates how much the project specifications data and the predefined expected business results data are in line with each other; and executing development of an application when it is determined that the similarity score is equal to or more than a predetermined threshold value.

According to yet another aspect of the instant disclosure, the plurality of applications may include web applications, mobile applications, and desktop applications, but the disclosure is not limited thereto.

According to a further aspect of the instant disclosure, when it is determined that the file is a PDF file, the method may further include: converting the PDF file into an image file.

According to another aspect of the instant disclosure, when it is determined that the file is a text file, the method may further include: converting the text file into an image file.

According to an aspect of the present disclosure, a system for real-time automated analysis of project specifications is disclosed. The system may include: a plurality of applications each including a file corresponding to real-time project specifications data; a processor; and a memory operatively connected to the processor via a communication interface, the memory storing computer readable instructions, when executed, may cause the processor to: call an API to invoke an OCR micro-service with the project specifications data as input data deployed on a cloud environment; determine whether the file corresponding to the project specification data is an image file; implement, based on determining, a neural network based image processing algorithm to extract data corresponding to the project specifications data from the input data; compare the extracted data corresponding to the project specifications data with predefined expected business results data; generate a similarity score, based on comparing, that identifies how similar the project specifications data is compared to the predefined expected business results data; and automatically generate a real-time analysis report on the project specifications in connection with the plurality of applications based on the similarity score.

According to yet another aspect of the instant disclosure, in generating the similarity score, the processor may be further configured to: implement a cosine similarity algorithm to measure similarities between the real-time project specifications data and the predefined expected business results data.

According to a further aspect of the instant disclosure, in implementing the cosine similarity algorithm, the processor may be further configured to: convert the real-time project specifications data into a first semantic context data; convert the first semantic context data into a first semantic context vector; convert the predefined expected business results data into a second semantic context data; and convert the second semantic context data into a second semantic context vector.

According to an additional aspect of the instant disclosure, in implementing the cosine similarity algorithm, the processor may be further configured to: compare the first semantic context vector and the second semantic context vector; automatically generate, in response to comparing, the similarity score that indicates how much the project specifications data and the predefined expected business results data are in line with each other; and execute development of an application when it is determined that the similarity score is equal to or more than a predetermined threshold value.

According to a further aspect of the instant disclosure, when it is determined that the file is a PDF file, the processor may be further configured to: convert the PDF file into an image file.

According to another aspect of the instant disclosure, when it is determined that the file is a text file, the processor may be further configured to: convert the text file into an image file.

According to an aspect of the present disclosure, a non-transitory computer readable medium configured to store instructions for real-time automated analysis of project specifications is disclosed. The instructions, when executed, may cause a processor to perform the following: calling an API to invoke an OCR micro-service with the project specifications data as input data received from a plurality of applications each including a file corresponding to real-time project specifications data; determining whether the file corresponding to the project specification data is an image file; implementing, based on determining, a neural network based image processing algorithm to extract data corresponding to the project specifications data from the input data; comparing the extracted data corresponding to the project specifications data with predefined expected business results data; generating a similarity score, based on comparing, that identifies how similar the project specifications data is compared to the predefined expected business results data; and automatically generating a real-time analysis report on the project specifications in connection with the plurality of applications based on the similarity score.

According to yet another aspect of the instant disclosure, in generating the similarity score, the instructions, when executed, may cause a processor to perform the following: implementing a cosine similarity algorithm to measure similarities between the real-time project specifications data and the predefined expected business results data.

According to a further aspect of the instant disclosure, in implementing the cosine similarity algorithm, the instructions, when executed, may cause a processor to perform the following: converting the real-time project specifications data into a first semantic context data; converting the first semantic context data into a first semantic context vector; converting the predefined expected business results data into a second semantic context data; and converting the second semantic context data into a second semantic context vector.

According to an additional aspect of the instant disclosure, in implementing the cosine similarity algorithm, the instructions, when executed, may cause a processor to perform the following: comparing the first semantic context vector and the second semantic context vector; automatically generating, in response to comparing, the similarity score that indicates how much the project specifications data and the predefined expected business results data are in line with each other; and executing development of an application when it is determined that the similarity score is equal to or more than a predetermined threshold value.

According to a further aspect of the instant disclosure, when it is determined that the file is a PDF file, the instructions, when executed, may cause a processor to perform the following: converting the PDF file into an image file.

According to another aspect of the instant disclosure, when it is determined that the file is a text file, the instructions, when executed, may cause a processor to perform the following: converting the text file into an image file.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
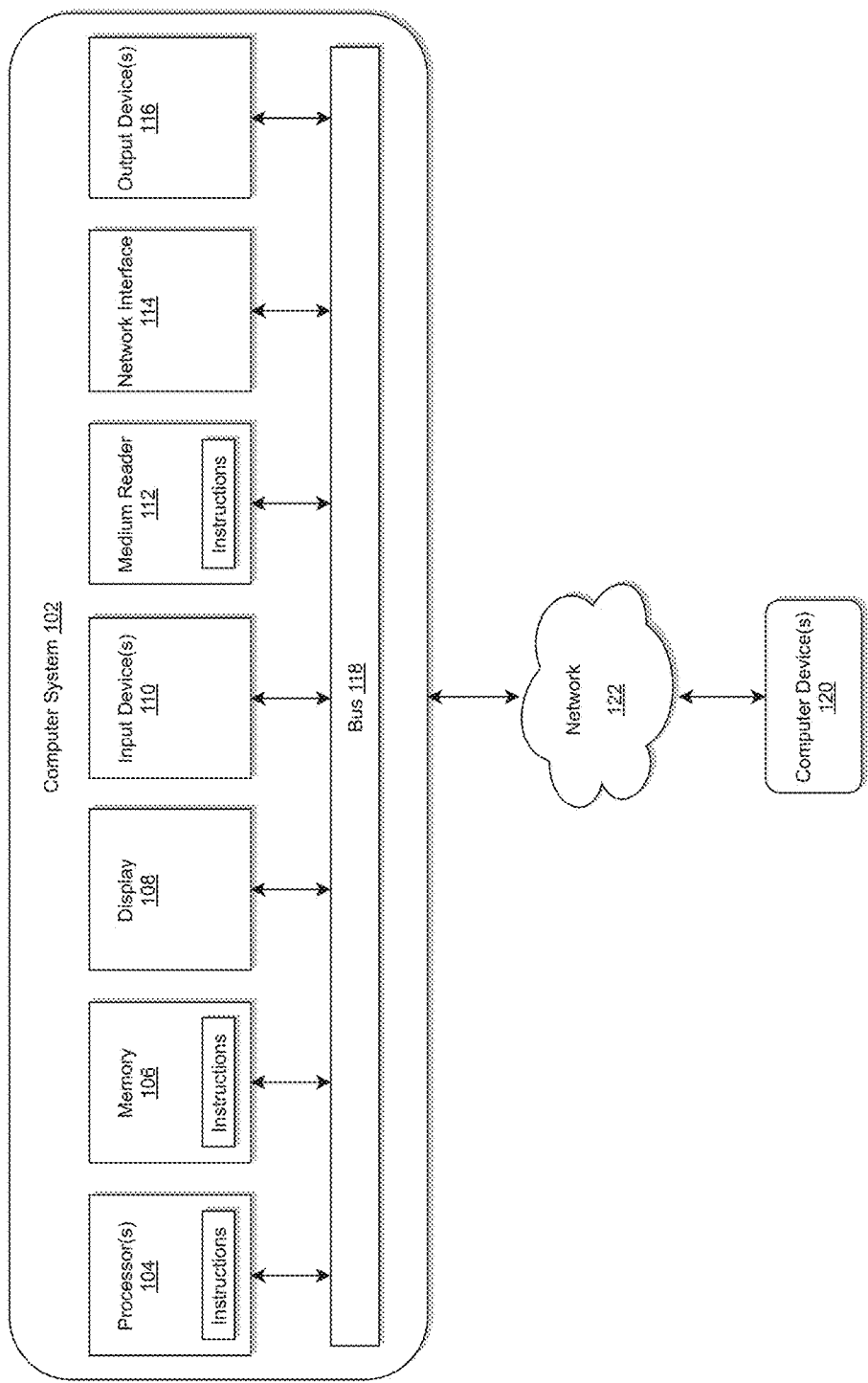
FIG. 1 illustrates a computer system for implementing a platform and language agnostic project specification analysis module that is configured for automatically providing real-time analysis of project specifications in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic project specification analysis module that is configured for automatically providing real-time analysis of project specifications in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the project specification analysis module may be platform and language agnostic that may allow for consistent easy orchestration and passing of data through various components to output a desired result. Since the disclosed process, according to exemplary embodiments, is platform and language agnostic, the project specification analysis module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
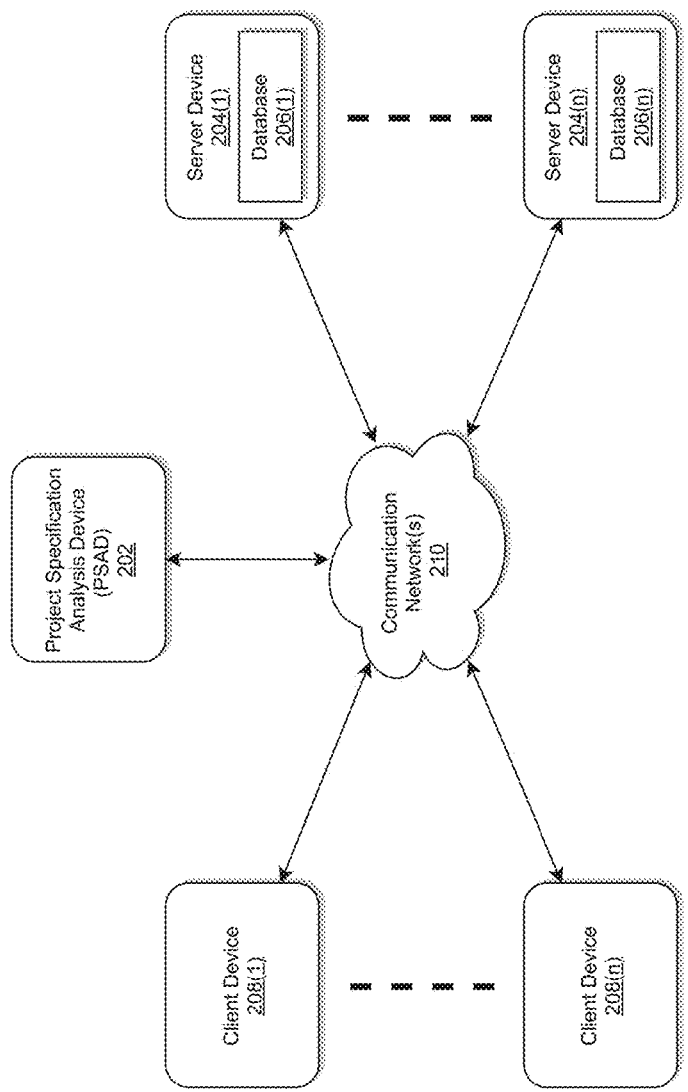
FIG. 2 illustrates an exemplary diagram of a network environment with a platform and language agnostic project specification analysis device in accordance with an exemplary embodiment.

Referring to FIG. 2, a schematic of an exemplary network environment 200 for implementing a platform and language agnostic project specification analysis device (PSAD) of the instant disclosure is illustrated.

According to exemplary embodiments, the above-described problems associated with conventional project management tools may be overcome by implementing a PSAD 202 as illustrated in FIG. 2 that may be configured for automatically providing real-time analysis of project specifications, but the disclosure is not limited thereto. For example, according to exemplary embodiments, the above-described problems associated with conventional project management tools may be overcome by implementing a PSAD 202 as illustrated in FIG. 2 that may be configured for implementing a platform and language agnostic project specification analysis module that may be configured for building an omni-channel, platform independent and in-house OCR service which can process text, image, or PDF files for data extraction or processing. For example, exemplary use cases may include: validating agreements, fraud dispute pre-arbitration forms, sanctions and check fraud detection, digital authentication etc., but the disclosure is not limited thereto.

The PSAD 202 may be the same or similar to the computer system 102 as described with respect to FIG. 1.

The PSAD 202 may store one or more applications that can include executable instructions that, when executed by the PSAD 202, cause the PSAD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PSAD 202 itself, may be located in virtual server(s) running in a cloud-based computing environment rather than being tied to one or more specific physical network computing devices. Also, the application(s) may be running in one or more virtual machines (VMs) executing on the PSAD 202. Additionally, in one or more embodiments of this technology, virtual machine(s) running on the PSAD 202 may be managed or supervised by a hypervisor.

In the network environment 200 of FIG. 2, the PSAD 202 is coupled to a plurality of server devices 204(1)-204(n) that hosts a plurality of databases 206(1)-206(n), and also to a plurality of client devices 208(1)-208(n) via communication network(s) 210. A communication interface of the PSAD 202, such as the network interface 114 of the computer system 102 of FIG. 1, operatively couples and communicates between the PSAD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PSAD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PSAD 202 may be a standalone device or integrated with one or more other devices or apparatuses, such as one or more of the server devices 204(1)-204(n), for example. In one particular example, the PSAD 202 may be hosted by one of the server devices 204(1)-204(n), and other arrangements are also possible. Moreover, one or more of the devices of the PSAD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PSAD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PSAD 202 that may efficiently provide a platform for implementing a platform and language agnostic project specification analysis module that may be configured for building an omni-channel, platform independent and in-house optical character recognition (OCR) service which can process text, image, or PDF files for data extraction or processing; automatically providing real-time analysis of project specifications.

The client devices 208(1)-208(n) may run interface applications, such as standard web browsers or standalone client applications, which may provide an interface to communicate with the PSAD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PSAD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PSAD 202, the server devices 204(1)-204(n), or the client devices 208(1)-208(n), for example, may be configured to operate as virtual instances on the same physical machine. For example, one or more of the PSAD 202, the server devices 204(1)-204(n), or the client devices 208(1)-208(n) may operate on the same physical device rather than as separate devices communicating through communication network(s) 210. Additionally, there may be more or fewer PSADs 202, server devices 204(1)-204(n), or client devices 208(1)-208(n) than illustrated in FIG. 2. According to exemplary embodiments, the PSAD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
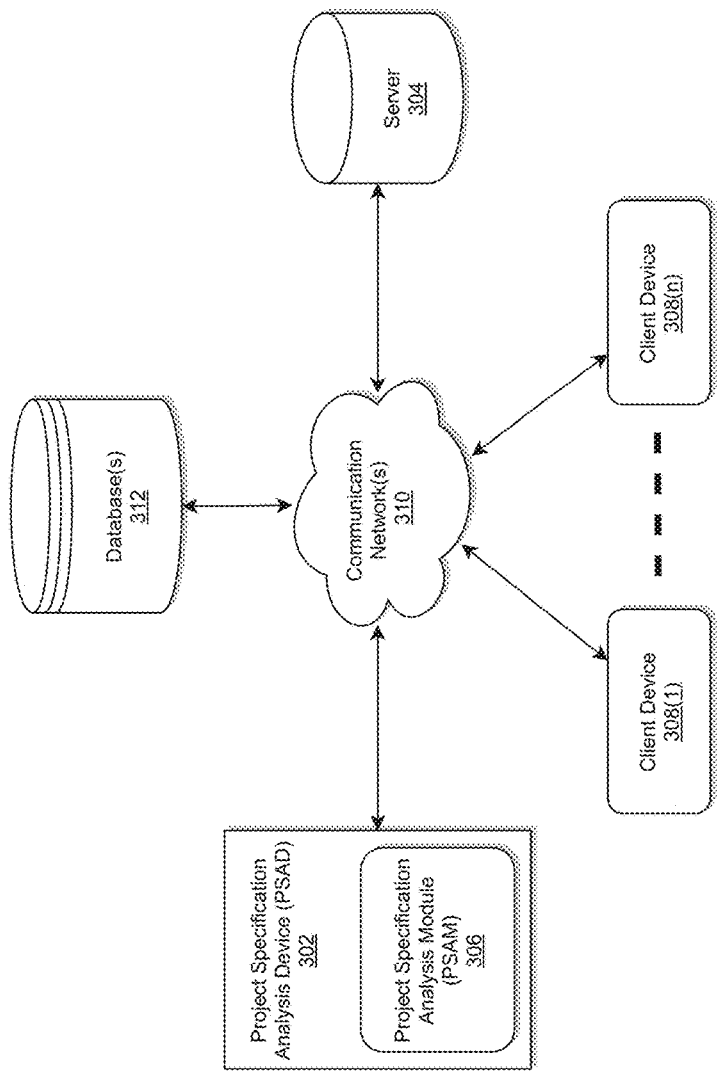
FIG. 3 illustrates a system diagram for implementing a platform and language agnostic project specification analysis device having a platform and language agnostic project specification analysis module in accordance with an exemplary embodiment.

FIG. 3 illustrates a system diagram for implementing a PSAD having a platform and language agnostic project specification analysis module (PSAM) in accordance with an exemplary embodiment.

As illustrated in FIG. 3, the system 300 may include a PSAD 302 within which a PSAM 306 is embedded, a server 304, a database(s) 312, a plurality of client devices 308(1) . . . 308(n), and a communication network 310.

According to exemplary embodiments, the PSAD 302 including the PSAM 306 may be connected to the server 304, and the database(s) 312 via the communication network 310. The PSAD 302 may also be connected to the plurality of client devices 308(1) . . . 308(n) via the communication network 310, but the disclosure is not limited thereto.

According to exemplary embodiment, the PSAD 302 is described and shown in FIG. 3 as including the PSAM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may that may produce programming for searching, monitoring, and analyzing machine-generated data via a web interface, etc., but the disclosure is not limited thereto.

According to exemplary embodiments, the PSAM 306 may be configured to receive real-time feed of data from the plurality of client devices 308(1) . . . 308(n) via the communication network 310.

As will be described below, the PSAM 306 may be configured to: call an API to invoke an OCR micro-service with the project specifications data as input data deployed on a cloud environment; determine whether the file corresponding to the project specification data is an image file; implement, based on determining, a neural network based image processing algorithm to extract data corresponding to the project specifications data from the input data; compare the extracted data corresponding to the project specifications data with predefined expected business results data; generate a similarity score, based on comparing, that identifies how similar the project specifications data is compared to the predefined expected business results data; and automatically generate a real-time analysis report on the project specifications in connection with the plurality of applications based on the similarity score, but the disclosure is not limited thereto.

The plurality of client devices 308(1) . . . 308(n) are illustrated as being in communication with the PSAD 302. In this regard, the plurality of client devices 308(1) . . . 308(n) may be "clients" of the PSAD 302 and are described herein as such. Nevertheless, it is to be known and understood that the plurality of client devices 308(1) . . . 308(n) need not necessarily be "clients" of the PSAD 302, or any entity described in association therewith herein. Any additional or alternative relationship may exist between either or both of the plurality of client devices 308(1) . . . 308(n) and the PSAD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the PSAD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The PSAD 302 may be the same or similar to the PSAD 202 as described with respect to FIG. 2, including any features or combination of features described with respect thereto.

Figure 4:
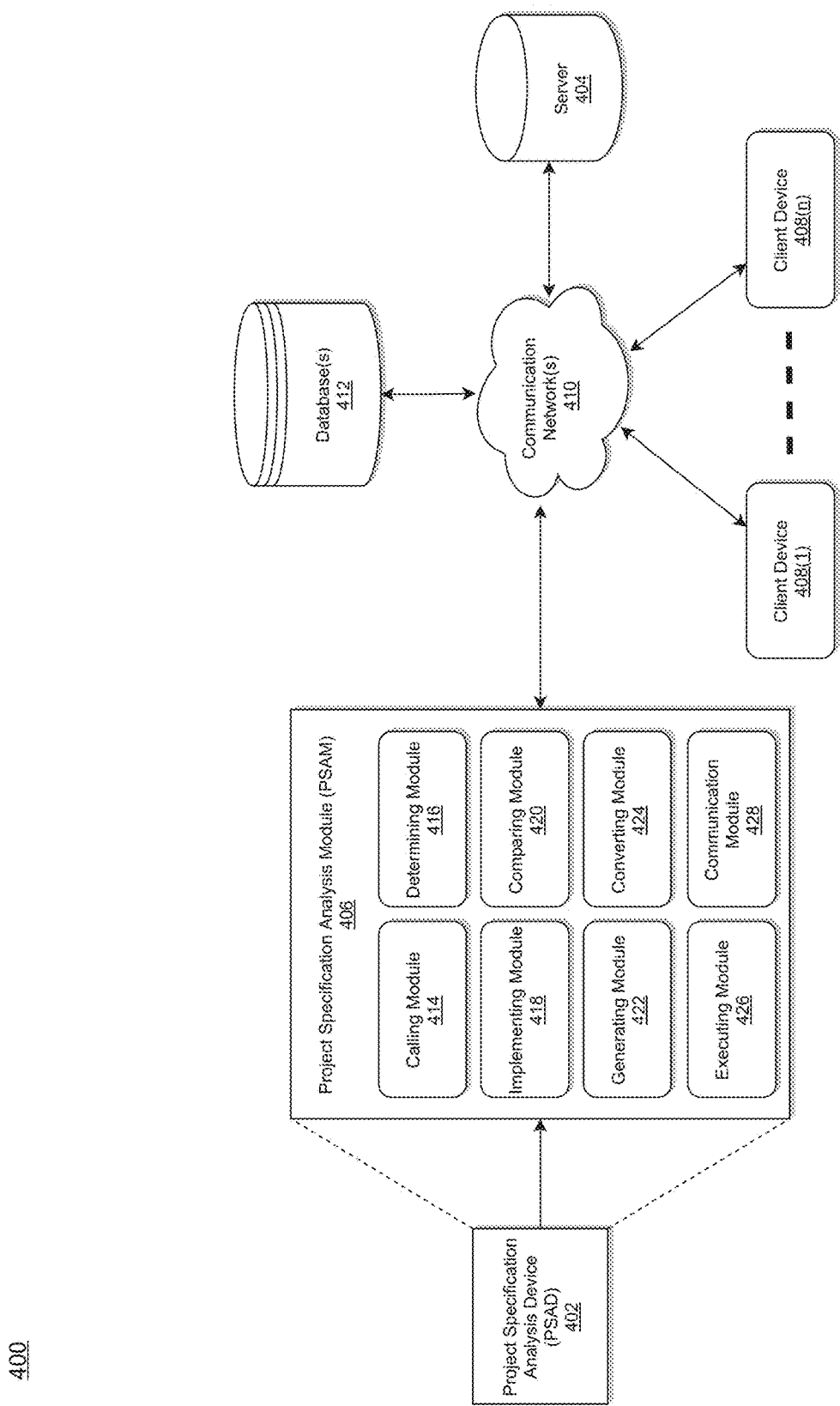
FIG. 4 illustrates a system diagram for implementing a platform and language agnostic project specification analysis module of FIG. 3 in accordance with an exemplary embodiment.

FIG. 4 illustrates a system diagram for implementing a PSAM of FIG. 3 in accordance with an exemplary embodiment.

According to exemplary embodiments, the system 400 may include a platform and language agnostic PSAD 402 within which a platform and language agnostic PSAM 406 is embedded, a server 404, database(s) 412, and a communication network 410.

According to exemplary embodiments, the PSAD 402 including the PSAM 406 may be connected to the server 404 and the database(s) 412 via the communication network 410. The PSAD 402 may also be connected to the plurality of client devices 408(1)-408(n) via the communication network 410, but the disclosure is not limited thereto. The PSAM 406, the server 404, the plurality of client devices 408(1)-408(n), the database(s) 412, the communication network 410 as illustrated in FIG. 4 may be the same or similar to the PSAM 306, the server 304, the plurality of client devices 308(1)-308(n), the database(s) 312, the communication network 310, respectively, as illustrated in FIG. 3.

According to exemplary embodiments, as illustrated in FIG. 4, the PSAM 406 may include a calling module 414, a determining module 416, an implementing module 418, a comparing module 420, a generating module 422, a converting module 424, an executing module 426, and a communication module 428.

According to exemplary embodiments, each of the calling module 414, determining module 416, implementing module 418, comparing module 420, generating module 422, converting module 424, executing module 426, and the communication module 428 of the PSAM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the calling module 414, determining module 416, implementing module 418, comparing module 420, generating module 422, converting module 424, executing module 426, and the communication module 428 of the PSAM 406 may be implemented by microprocessors or similar, and may be programmed using software (e.g., microcode) to perform various functions discussed herein and may optionally be driven by firmware and/or software.

Alternatively, according to exemplary embodiments, each of the calling module 414, determining module 416, implementing module 418, comparing module 420, generating module 422, converting module 424, executing module 426, and the communication module 428 of the PSAM 406 may be implemented by dedicated hardware, or as a combination of dedicated hardware to perform some functions and a processor (e.g., one or more programmed microprocessors and associated circuitry) to perform other functions.

According to exemplary embodiments, each of the calling module 414, determining module 416, implementing module 418, comparing module 420, generating module 422, converting module 424, executing module 426, and the communication module 428 of the PSAM 406 may be called via corresponding API.

The process may be executed via the communication module 428 and the communication network 410, which may comprise plural networks as described above. For example, in an exemplary embodiment, the various components of the PSAM 406 may communicate with the server 404, and the database(s) 412 via the communication module 428 and the communication network 410. Of course, these embodiments are merely exemplary and are not limiting or exhaustive.

Figure 5:
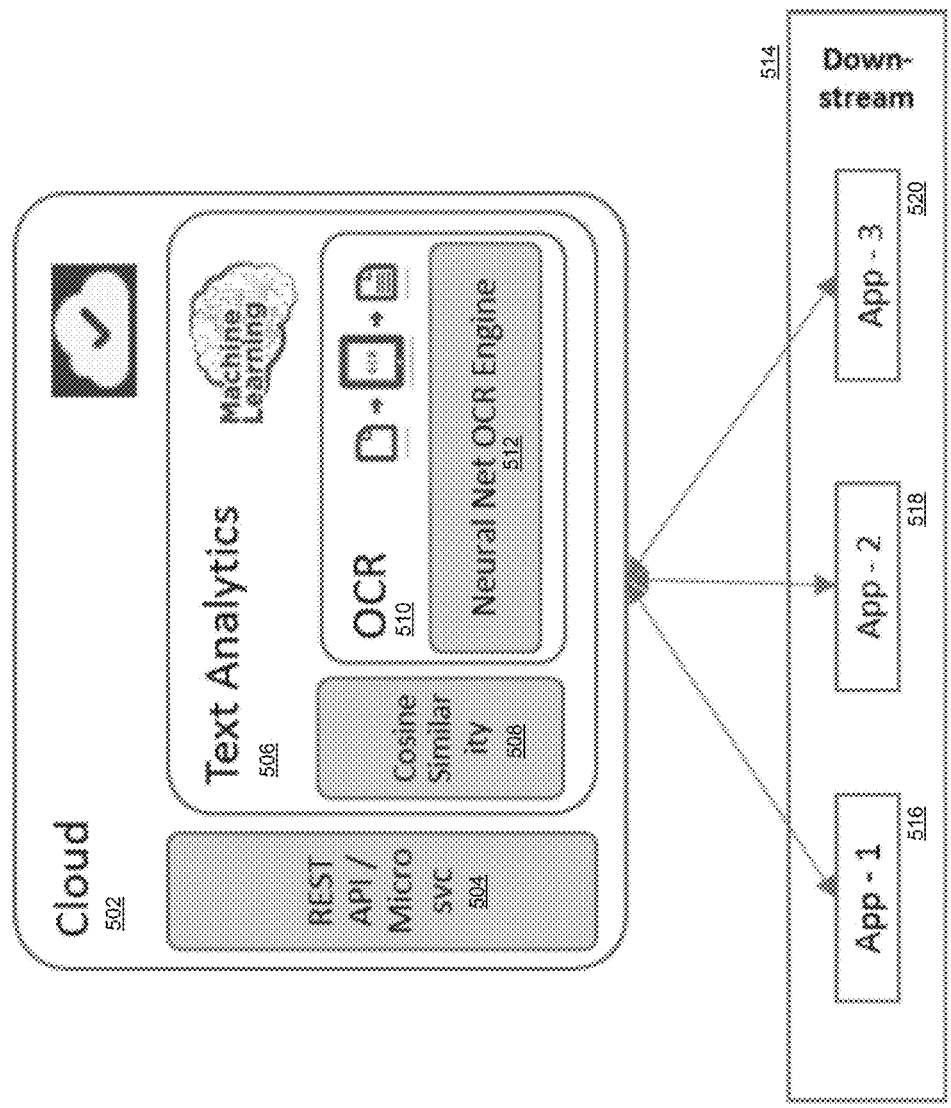
FIG. 5 illustrates an exemplary cloud architecture implemented by the platform and language agnostic project specification analysis module of FIG. 4 in accordance with an exemplary embodiment.

FIG. 5 illustrates an exemplary cloud architecture 500 implemented by the platform and language agnostic PSAM 406 of FIG. 4 in accordance with an exemplary embodiment. As illustrated in FIG. 5, a rest API/microservice 504, a text analytics block 506, a cosine similarity block 508, and an OCR 506 having a neural network OCR engine 512 are deployed on the cloud environment 502. The cloud environment 502 may be operatively connected to a plurality of down-stream applications 514, such as app-1 516, app-2 518, app-3 520, but the disclosure is not limited thereto. Each of the plurality of applications 514 (e.g., app-1 516, app-2 518, app-3 520) may include a file corresponding to real-time project specifications data. The plurality of applications 514 may include web applications, mobile applications, and desktop applications, etc., but the disclosure is not limited thereto. For example, app-1 516 may be a web application, app-2 518 may be a mobile application, and app-3 520 may be a desktop application, but the disclosure is not limited thereto.

Referring back to FIGS. 4 and 5, the calling module 414 may be configured to call an API to invoke an OCR micro-service (e.g., rest API/microservice 504) with the project specifications data as input data deployed on a cloud environment (e.g., cloud 502). The determining module 416 may be configured to determine whether the file corresponding to the project specification data is an image file. The implementing module 418 may be configured to implement, based on determining, a neural network based image processing algorithm (e.g., by utilizing OCR 510 and neural network OCR engine 512) to extract data corresponding to the project specifications data from the input data.

According to exemplary embodiments, the comparing module 420 may be configured to compare the extracted data corresponding to the project specifications data with predefined expected business results data. The generating module 422 may be configured to generate a similarity score, based on comparing, that identifies how similar the project specifications data is compared to the predefined expected business results data. The generating module 422 may further be configured to automatically generate a real-time analysis report on the project specifications in connection with the plurality of applications based on the similarity score.

Figure 9:
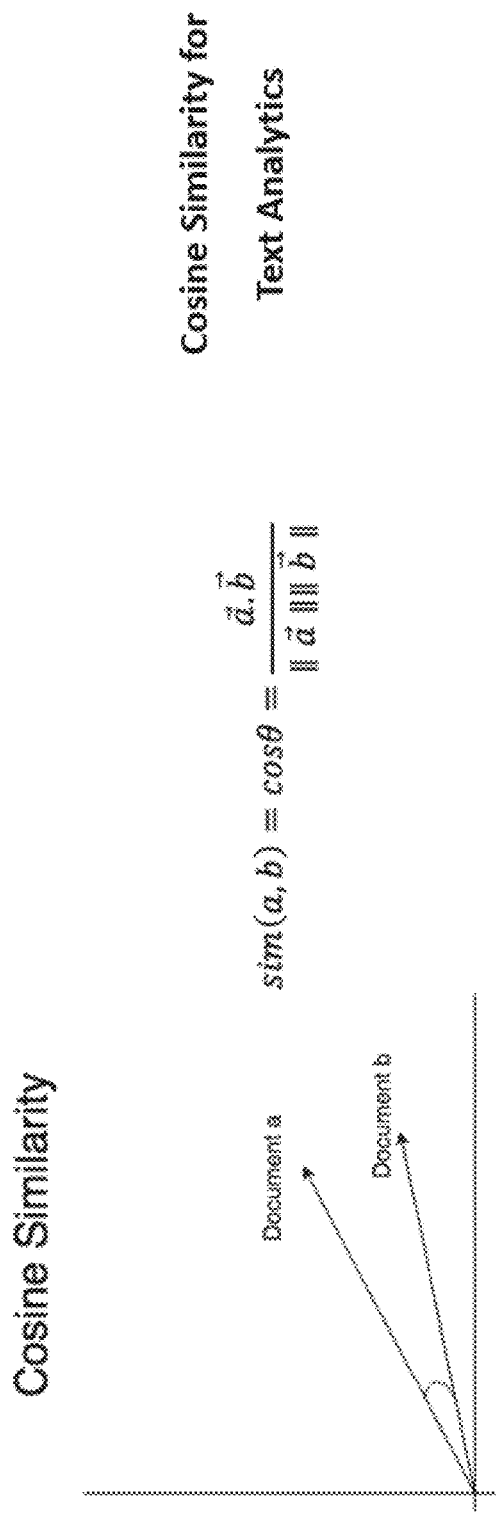
FIG. 9 illustrates an exemplary cosine similarity algorithm implemented by the platform and language agnostic project specification analysis module of FIG. 4 in accordance with an exemplary embodiment.

FIG. 9 illustrates an exemplary cosine similarity algorithm 900 implemented by the PSAM 406 of FIG. 4 in accordance with an exemplary embodiment. For example, according to exemplary embodiments, in generating the similarity score, the generating module 422 may be further configured to the implement a cosine similarity algorithm 900 to measure similarities between the real-time project specifications data and the predefined expected business results data. As illustrated in FIG. 9, document 'a' may correspond to a document that includes real-time project specifications data and document 'b' may correspond to a document that includes predefined expected business results data.

According to exemplary embodiments, in implementing the cosine similarity algorithm 900, the converting module 424 may be further configured to: convert the real-time project specifications data into a first semantic context data; convert the first semantic context data into a first semantic context vector; convert the predefined expected business results data into a second semantic context data; and convert the second semantic context data into a second semantic context vector.

According to exemplary embodiments, in implementing the cosine similarity algorithm, the comparing module 420 may be further configured to compare the first semantic context vector and the second semantic context vector; the generating module 422 may be further configured to automatically generate, in response to comparing by the comparing module 420, the similarity score that indicates how much the project specifications data and the predefined expected business results data are in line with each other; and the executing module 426 may be configured to execute development/deployment/testing of an application when it is determined that the similarity score is equal to or more than a predetermined threshold value.

According to exemplary embodiments, when it is determined that the file is a PDF file, the converting module 424 may be further configured to: convert the PDF file into an image file.

According to exemplary embodiments, when it is determined that the file is a text file, the converting module 424 may be further configured to: convert the text file into an image file.

Figure 6:
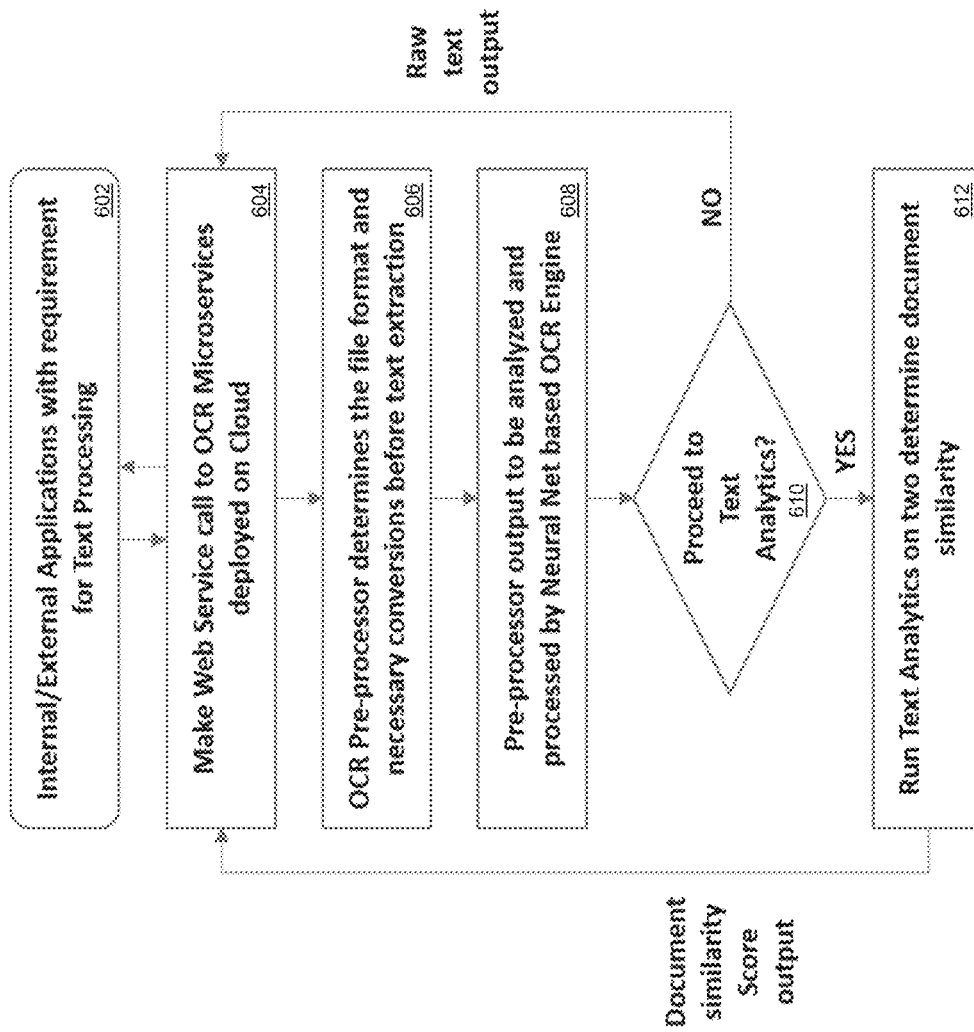
FIG. 6 illustrates an exemplary flow chart implemented by the platform and language agnostic project specification analysis module of FIG. 4 for generating a similarity score in accordance with an exemplary embodiment.

FIG. 6 illustrates an exemplary flow chart 600 implemented by the PSAM 406 of FIG. 4 for generating a similarity score in accordance with an exemplary embodiment.

Figure 7:
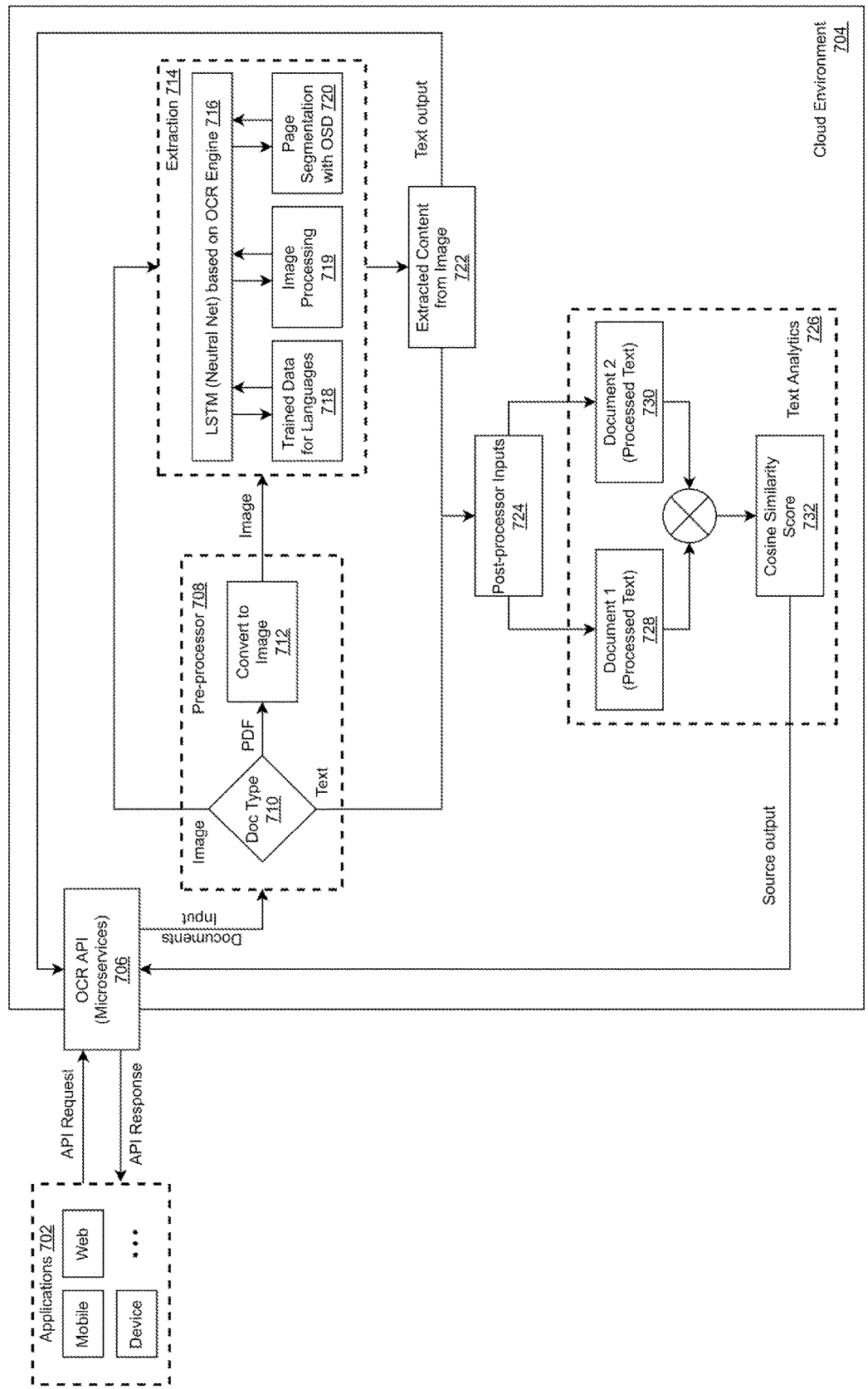
FIG. 7 illustrates another exemplary cloud architecture implemented by the platform and language agnostic project specification analysis module of FIG. 4 in accordance with an exemplary embodiment.

FIG. 7 illustrates another exemplary cloud architecture 700 implemented by the PSAM 406 of FIG. 4 for automatically providing real-time analysis of project specifications in accordance with an exemplary embodiment in accordance with an exemplary embodiment. As illustrated in FIG. 7, OCR API microservices 706, a pre-processor 708, a data extraction block 714, and a text analytics block 726 may be deployed on a cloud environment 704. The cloud environment 704 may be operatively connected to a plurality of applications 702.

Referring to FIGS. 6, 7, and 9, according to exemplary embodiments, at step 602, internal or external applications with requirement for text processing may be provided. At step 604, a web service call may be made to the OCR API microservices 706 deployed on the cloud environment 704. At step 606, the pre-processor 708 may determine the file format and necessary conversions before text extraction.

For example, when the pre-processor 708 determines that the document type 710 received from the OCR API microservices 706 is an image file, it may output the image file as is without conversion for consumption by the extraction block 714. However, when the pre-processor 708 determines that the document type 710 received from the OCR API microservices 706 is either a text file or a PDF file, it may first convert (e.g., by utilizing element 712 in FIG. 7) each of the text file and the PDF file to an image file and may output the image file for consumption by the extraction block 714.

At step 608, the pre-processor output (e.g., an image file) may be analyzed and processed by a neural network based OCR engine 716 included in the extraction block 714. For example, according to exemplary embodiments, the neural network based OCR engine 716 may implement long short-term memory (LSTM) neural network architecture. Each of a trained data for languages block 718, an image processing block 719 and a page segmentation block 720 may bi-directionally communicate with the neural network based OCR engine 716 to output 722 extracted context from the image file received from the pre-processor 708.

At step 610, it may be determined whether output from the neural network based OCR engine 716 has been proceeded to the text analytics block 726.

According to exemplary embodiments, when it is determined that the output from the neural network based OCR engine 716 has not been proceeded to the text analytics block 726, the process 600 loops back to step 604 with raw text output data.

According to exemplary embodiments, the post-processor inputs 724 may include the processed text corresponding to document 1 (element 728 in FIG. 7 or document 'a' in FIG. 9) and the processed text from document 2 (element 730 in FIG. 7 or document 'b' in FIG. 9).

According to exemplary embodiments, when it is determined that the output from the neural network based OCR engine 716 has proceeded to the text analytics block 726, at step 612, the process 600 may implement a cosine similarity algorithm 900 as illustrated in FIG. 9 to determine similarities between document 1 (element 728 in FIG. 7 or document 'a' in FIG. 9) and document and document 2 (element 730 in FIG. 7 or document 'b' in FIG. 9) and generate a cosine similarity score 732. The process 600 then loops back to step 604.

Figure 8:
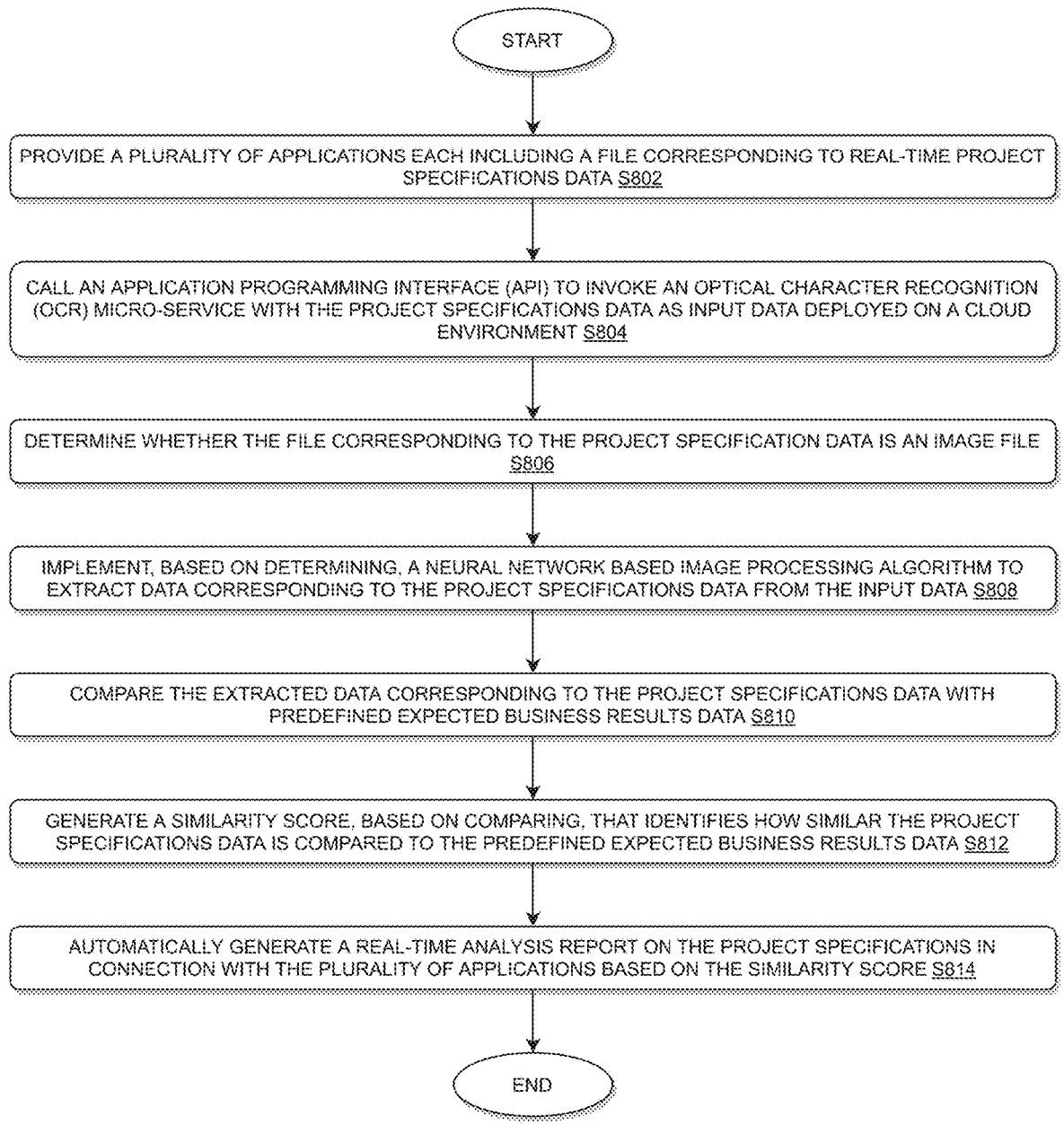
FIG. 8 illustrates an exemplary flow chart implemented by the platform and language agnostic project specification analysis module of FIG. 4 for automatically providing real-time analysis of project specifications in accordance with an exemplary embodiment.

FIG. 8 illustrates an exemplary flow chart 800 implemented by the PSAM 406 of FIG. 4 for automatically providing real-time analysis of project specifications in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include providing a plurality of applications (i.e., mobile applications, web applications, desktop applications, etc.) each including a file corresponding to real-time project specifications data.

At step S804, the process 800 may include calling an application programming interface (API) to invoke an optical character recognition (OCR) micro-service with the project specifications data as input data deployed on a cloud environment.

At step S806, the process 800 may include determining whether the file corresponding to the project specification data is an image file.

At step S808, the process 800 may include implementing, based on determining, a neural network based image processing algorithm to extract data corresponding to the project specifications data from the input data.

At step S810, the process 800 may include comparing the extracted data corresponding to the project specifications data with predefined expected business results data.

At step S812, the process 800 may include generating a similarity score, based on comparing, that identifies how similar the project specifications data is compared to the predefined expected business results data.

At step S814, the process 800 may include automatically generating a real-time analysis report on the project specifications in connection with the plurality of applications based on the similarity score.

According to exemplary embodiments, in generating the similarity score, the process 800 may further include: implementing a cosine similarity algorithm to measure similarities between the real-time project specifications data and the predefined expected business results data.

According to exemplary embodiments, in implementing the cosine similarity algorithm, the process 800 may further include: converting the real-time project specifications data into a first semantic context data; converting the first semantic context data into a first semantic context vector; converting the predefined expected business results data into a second semantic context data; and converting the second semantic context data into a second semantic context vector.

According to exemplary embodiments, in implementing the cosine similarity algorithm, the process 800 may further include: comparing the first semantic context vector and the second semantic context vector; automatically generating, in response to comparing, the similarity score that indicates how much the project specifications data and the predefined expected business results data are in line with each other; and executing development of an application when it is determined that the similarity score is equal to or more than a predetermined threshold value.

According to exemplary embodiments, when it is determined that the file is a PDF file, the process 800 may further include: converting the PDF file into an image file.

According to exemplary embodiments, when it is determined that the file is a text file, the process 800 may further include: converting the text file into an image file.

According to exemplary embodiments, the PSAD 402 may include a memory (e.g., a memory 106 as illustrated in FIG. 1) which may be a non-transitory computer readable medium that may be configured to store instructions for implementing a PSAM 406 for real-time automated analysis of project specifications as disclosed herein. The PSAD 402 may also include a medium reader (e.g., a medium reader 112 as illustrated in FIG. 1) which may be configured to read any one or more sets of instructions, e.g., software, from any of the memories described herein. The instructions, when executed by a processor embedded within the PSAM 406 or within the PSAD 402, may be used to perform one or more of the methods and processes as described herein. In a particular embodiment, the instructions may reside completely, or at least partially, within the memory 106, the medium reader 112, and/or the processor 104 (see FIG. 1) during execution by the PSAD 402.

According to exemplary embodiments, the instructions, when executed, may cause a processor embedded within the PSAM 406 or the PSAD 402 to perform the following: calling an API to invoke an OCR micro-service with the project specifications data as input data received from a plurality of applications each including a file corresponding to real-time project specifications data; determining whether the file corresponding to the project specification data is an image file; implementing, based on determining, a neural network based image processing algorithm to extract data corresponding to the project specifications data from the input data; comparing the extracted data corresponding to the project specifications data with predefined expected business results data; generating a similarity score, based on comparing, that identifies how similar the project specifications data is compared to the predefined expected business results data; and automatically generating a real-time analysis report on the project specifications in connection with the plurality of applications based on the similarity score. According to exemplary embodiments, the processor may be the same or similar to the processor 104 as illustrated in FIG. 1 or the processor embedded within PSAD 202, PSAD 302, PSAD 402, and PSAM 406.

According to exemplary embodiments, in generating the similarity score, the instructions, when executed, may cause a processor 104 to perform the following: implementing a cosine similarity algorithm to measure similarities between the real-time project specifications data and the predefined expected business results data.

According to exemplary embodiments, in implementing the cosine similarity algorithm, the instructions, when executed, may cause a processor 104 to perform the following: converting the real-time project specifications data into a first semantic context data; converting the first semantic context data into a first semantic context vector; converting the predefined expected business results data into a second semantic context data; and converting the second semantic context data into a second semantic context vector.

According to exemplary embodiments, in implementing the cosine similarity algorithm, the instructions, when executed, may cause a processor 104 to perform the following: comparing the first semantic context vector and the second semantic context vector; automatically generating, in response to comparing, the similarity score that indicates how much the project specifications data and the predefined expected business results data are in line with each other; and executing development of an application when it is determined that the similarity score is equal to or more than a predetermined threshold value.

According to exemplary embodiments, when it is determined that the file is a PDF file, the instructions, when executed, may cause a processor 104 to perform the following: converting the PDF file into an image file.

According to exemplary embodiments, when it is determined that the file is a text file, the instructions, when executed, may cause a processor 104 to perform the following: converting the text file into an image file.

According to exemplary embodiments, an exemplary first use case scenario may include credit card payment. In implementation of the credit card payment by the PSAM 406, when an image which depicts business requirements is given as an input to the PSAM 406, it checks them against acceptance criteria which are used by developers to implement the requirements and generates similarity score.

For example, according to exemplary embodiments, a user (e.g., client/customer) facing a screen (i.e., the image/UI input) on a website or a mobile device may include: a banner on the top of the page showing the company/user segment branding; main menu below the banner, which allows the users to navigate to various website features; a dashboard below the main menu, displaying logged in user's accounts with associated balances; links against each accounts to perform account specific operations; a fly-out screen on the right side of the page which opens when a link is clicked, but the disclosure is not limited thereto. The fly-out, according to exemplary embodiments, may include elaborated account and payment details along with branding icons.

According to exemplary embodiments, with regards to business results data disclosed herein, as a customer with a credit card account, one may want to be able to pay the credit card outstanding amount from the main fly-out so that the payment can be made faster. In this regards, upon clicking on a pay link for the credit card account on the accounts dashboard, the PSAM 406 may display the fly-out screen; display the account name/nickname and last four digits of the account number at the top of the fly-out along with the card art; display the last payment amount, last payment date and next payment due date below the account name; when the customer selects a payment amount, payment date and pay from account, allow the customer to click on pay this bill button; once the payment goes though, display a success message to the customer, but the disclosure is not limited thereto.

According to exemplary embodiments, with regards to acceptance criteria disclosed herein, there may be two scenarios. For example, with respect to scenario 1 (i.e., when user clicks on the pay link for the credit card account, opens the fly-out), the acceptance criteria may include: given a credit card user login to the website; when the user clicks on "pay" link from the dashboard; then the user is navigated to fly-out screen, but the disclosure is not limited thereto. For example, with respect to scenario 2 (i.e., display the card art), the acceptance criteria may include: given a credit card user login to the website; and user clicks on "pay" link from the dashboard; when navigated to the fly-out; then display the card art according to user's account, but the disclosure is not limited thereto.

According to exemplary embodiments, an exemplary second use case scenario may include gift card purchase. In implementation of the gift card purchase by the PSAM 406, when an image which depicts business requirements is given as an input to the PSAM 406, it checks them against acceptance criteria which are used by developers to implement the requirements and generates similarity score.

For example, according to exemplary embodiments, a user (e.g., client/customer) facing a screen (i.e., the image/UI input) on a website or a mobile device may include: a banner on the top of the page showing the company/user segment branding; main menu below the banner, which allows the users to navigate to various website features; a search box below the main menu to search for various brands of gift cards; a dashboard below the search box, displaying tiles of images related to gift cards along with the name and cost; a fly-out on the right side of the screen which opens when a gift card tile is clicked, but the disclosure is not limited thereto. The fly-out, according to exemplary embodiments, may display elaborated details about the gift card along with purchase options.

According to exemplary embodiments, with regards to business results data disclosed herein, as a customer with eligible account on the website, one may want to be able to search a gift card of choice and purchase the same. In this regards, when a user enters the landing page, a search box should be present to explore gift cards of choice; upon clicking on a tile in the gift card dashboard, display the fly-out screen; display the gift card branding icon at the center of the fly-out; display user inputs like cost of the gift card, quantity to be purchased and total cost below the branding icon; when the details are entered, allow the user to click on buy this card button; once the payment goes though, display a success message to the user, but the disclosure is not limited thereto.

According to exemplary embodiments, with regards to acceptance criteria for the gift card purchase scenario disclosed herein, there may be two scenarios. For example, with respect to scenario 1 (i.e., user should be allowed to select a gift card of choice), the acceptance criteria may include: given a user login to the website; when user enters the landing page; then there should be an input search box to enter details, but the disclosure is not limited thereto. For example, with respect to scenario 2 (i.e., purchase a gift card), the acceptance criteria may include: given a user login to the website; and user clicks a gift card from the dashboard tiles; then display a fly-out screen with details and buy this card button, but the disclosure is not limited thereto.

According to exemplary embodiments as disclosed above in FIGS. 1-9, technical improvements effected by the instant disclosure may include a platform for automatically providing real-time analysis of project specifications, but the disclosure is not limited thereto. For example, according to exemplary embodiments as disclosed above in FIGS. 1-9, technical improvements effected by the instant disclosure may include a platform for implementing a platform and language agnostic project specification analysis module that may be configured for building an omni-channel, platform independent and in-house OCR service which can process text, image, or PDF files for data extraction or processing.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for real-time automated analysis of project specifications by utilizing one or more processors along with allocated memory, the method comprising:
    providing a plurality of applications each including a file corresponding to real-time project specifications data;
    calling an application programming interface (API) to invoke an optical character recognition (OCR) microservice with the project specifications data as input data deployed on a cloud environment;

determining whether the file corresponding to the project specification data is an image file;

implementing, based on determining, a neural network-based image processing algorithm to extract data corresponding to the project specifications data from the input data;

comparing the extracted data corresponding to the project specifications data with predefined expected business results data;

generating a similarity score, based on comparing, that identifies how similar the project specifications data is compared to the predefined expected business results data; and automatically generating a real-time analysis report on the project specifications in connection with the plurality of applications based on the similarity score, wherein, in generating the similarity score, the method further comprising:

implementing a cosine similarity algorithm to measure similarities between the real-time project specifications data and the predefined expected business results data;

converting the real-time project specifications data into a first semantic context data;

converting the first semantic context data into a first semantic context vector;

converting the predefined expected business results data into a second semantic context data;

converting the second semantic context data into a second semantic context vector; and automatically generating, in response to comparing, the similarity score that indicates how much the project specifications data and the predefined expected business results data are in line with each other.

2. The method according to claim 1, further comprising:
comparing the first semantic context vector and the second semantic context vector; and
executing development of an application when it is determined that the similarity score is equal to or more than a predetermined threshold value.

3. The method according to claim 1, wherein the plurality of applications includes web applications, mobile applications, and desktop applications.

4. The method according to claim 1, wherein, when it is determined that the file is a PDF file, the method further comprising:
converting the PDF file into an image file.

5. The method according to claim 1, wherein, when it is determined that the file is a text file, the method further comprising:
converting the text file into an image file.

6. A system for real-time automated analysis of project specifications, the system comprising:
a plurality of applications each including a file corresponding to real-time project specifications data;
a processor; and
a memory operatively connected to the processor via a communication interface, the memory storing computer readable instructions, when executed, causes the processor to:
call an application programming interface (API) to invoke an optical character recognition (OCR) micro-service with the project specifications data as input data deployed on a cloud environment;
determine whether the file corresponding to the project specification data is an image file;
implement, based on determining, a neural network based image processing algorithm to extract data corresponding to the project specifications data from the input data;
compare the extracted data corresponding to the project specifications data with predefined expected business results data;
generate a similarity score, based on comparing, that identifies how similar the project specifications data is compared to the predefined expected business results data; and
automatically generate a real-time analysis report on the project specifications in connection with the plurality of applications based on the similarity score,
wherein, in generating the similarity score, the processor is further configured to:
implement a cosine similarity algorithm to measure similarities between the real-time project specifications data and the predefined expected business results data;
convert the real-time project specifications data into a first semantic context data;
convert the first semantic context data into a first semantic context vector;
convert the predefined expected business results data into a second semantic context data;
convert the second semantic context data into a second semantic context vector; and
automatically generate, in response to comparing, the similarity score that indicates how much the project specifications data and the predefined expected business results data are in line with each other.

7. The system according to claim 6, wherein the processor is further configured to:
compare the first semantic context vector and the second semantic context vector; and
execute development of an application when it is determined that the similarity score is equal to or more than a predetermined threshold value.

8. The system according to claim 6, wherein the plurality of applications includes web applications, mobile applications, and desktop applications.

9. The system according to claim 6, wherein, when it is determined that the file is a PDF file, the processor is further configured to:
convert the PDF file into an image file.

10. The system according to claim 6, wherein, when it is determined that the file is a text file, the processor is further configured to:
convert the text file into an image file.

11. A non-transitory computer readable medium configured to store instructions for real-time automated analysis of project specifications, wherein, when executed, the instructions cause a processor to perform the following:
calling an application programming interface (API) to invoke an optical character recognition (OCR) micro-service with the project specifications data as input data received from a plurality of applications each including a file corresponding to real-time project specifications data;
determining whether the file corresponding to the project specification data is an image file;
implementing, based on determining, a neural network based image processing algorithm to extract data corresponding to the project specifications data from the input data;

comparing the extracted data corresponding to the project specifications data with predefined expected business results data;
generating a similarity score, based on comparing, that identifies how similar the project specifications data is compared to the predefined expected business results data; and
automatically generating a real-time analysis report on the project specifications in connection with the plurality of applications based on the similarity score,
wherein, in generating the similarity score, the instructions, when executed, further cause the processor to perform the following:
implementing a cosine similarity algorithm to measure similarities between the real-time project specifications data and the predefined expected business results data;
converting the real-time project specifications data into a first semantic context data;
converting the first semantic context data into a first semantic context vector;
converting the predefined expected business results data into a second semantic context data;
converting the second semantic context data into a second semantic context vector; and
automatically generating, in response to comparing, the similarity score that indicates how much the project specifications data and the predefined expected business results data are in line with each other.

12. The non-transitory computer readable medium according to claim 11, wherein the instructions, when executed, further cause the processor to perform the following:
comparing the first semantic context vector and the second semantic context vector; and
executing development of an application when it is determined that the similarity score is equal to or more than a predetermined threshold value.

13. The non-transitory computer readable medium according to claim 11, wherein the plurality of applications includes web applications, mobile applications, and desktop applications.

14. The non-transitory computer readable medium according to claim 11, wherein:
when it is determined that the file is a PDF file, the instructions, when executed, further cause the processor to convert the PDF file into an image file; and
when it is determined that the file is a text file, the instructions, when executed, further cause the processor to convert the text file into an image file.

* * * * *